United States Patent
Lu et al.

(10) Patent No.: US 10,221,970 B2
(45) Date of Patent: Mar. 5, 2019

(54) AIR SEPARATION UNIT HEAT EXCHANGER WITH POROUS BOILING SURFACE COATINGS

(71) Applicants: Zigui Lu, East Amherst, NY (US); Sang Muk Kwark, Holly Springs, NC (US); Joseph M. Corpus, Avon, IN (US); Jonathan A. Lane, Snyder, NY (US); David P. Potempa, Boston, NY (US); Maulik R. Shelat, Williamsville, NY (US)

(72) Inventors: Zigui Lu, East Amherst, NY (US); Sang Muk Kwark, Holly Springs, NC (US); Joseph M. Corpus, Avon, IN (US); Jonathan A. Lane, Snyder, NY (US); David P. Potempa, Boston, NY (US); Maulik R. Shelat, Williamsville, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 0 days.

(21) Appl. No.: 16/014,642

(22) Filed: Jun. 21, 2018

(65) Prior Publication Data
US 2018/0299035 A1  Oct. 18, 2018

Related U.S. Application Data

(63) Continuation of application No. 14/884,087, filed on Oct. 15, 2015, now Pat. No. 10,047,880.

(51) Int. Cl.
| | |
|---|---|
| C09D 5/26 | (2006.01) |
| C09D 101/28 | (2006.01) |
| C09D 131/02 | (2006.01) |
| C08J 9/00 | (2006.01) |
| B22F 7/00 | (2006.01) |
| C23C 24/08 | (2006.01) |
| F16L 9/02 | (2006.01) |
| F28F 13/18 | (2006.01) |
| C09D 1/00 | (2006.01) |
| C09D 5/00 | (2006.01) |
| C08K 3/22 | (2006.01) |
| C08K 3/08 | (2006.01) |

(52) U.S. Cl.
CPC .............. *F16L 9/02* (2013.01); *C08J 9/0066* (2013.01); *C09D 1/00* (2013.01); *C09D 5/00* (2013.01); *C09D 5/26* (2013.01); *C09D 101/284* (2013.01); *C09D 131/02* (2013.01); *C23C 24/082* (2013.01); *F28F 13/187* (2013.01); *C08J 2301/28* (2013.01); *C08J 2331/02* (2013.01); *C08K 3/08* (2013.01); *C08K 3/22* (2013.01); *C08K 2003/0812* (2013.01); *C08K 2201/003* (2013.01); *C08K 2201/014* (2013.01); *Y02P 20/124* (2015.11)

(58) Field of Classification Search
None
See application file for complete search history.

(56) References Cited

U.S. PATENT DOCUMENTS

| | | |
|---|---|---|
| 3,248,251 A | 4/1966 | Allen |
| 3,384,154 A | 5/1968 | Milton |
| 3,523,577 A | 8/1970 | Milton |
| 3,587,730 A | 6/1971 | Milton |
| 3,607,369 A | 9/1971 | Batta |
| 3,677,721 A | 7/1972 | Elbert et al. |
| 3,753,757 A | 8/1973 | Rodgers et al. |
| 4,064,914 A | 12/1977 | Grant |
| 4,074,753 A | 2/1978 | Schmittle et al. |
| 4,182,412 A | 1/1980 | Shum |
| 4,232,056 A | 11/1980 | Grant et al. |
| 4,291,758 A | 9/1981 | Fujii et al. |
| 4,358,485 A | 11/1982 | Kern et al. |
| 4,359,086 A | 11/1982 | Sanborn et al. |
| 4,653,572 A | 3/1987 | Bennett et al. |
| 4,663,243 A | 5/1987 | Czikk et al. |
| 4,699,209 A | 10/1987 | Thorogood |
| 4,917,960 A | 4/1990 | Hornberger et al. |
| 5,814,392 A | 9/1998 | You et al. |
| 6,119,770 A | 9/2000 | Jaber |
| 7,677,300 B2 | 3/2010 | O'Neill et al. |
| 10,047,880 B2 * | 8/2018 | Lu .................... C08J 9/0066 |
| 2007/0202321 A1 | 8/2007 | You et al. |
| 2007/0240603 A1 | 10/2007 | Ko |
| 2007/0256590 A1 | 11/2007 | Scott |
| 2010/0044018 A1 | 2/2010 | Furberg |
| 2010/0129639 A1 | 5/2010 | Icoz |

(Continued)

OTHER PUBLICATIONS

"Nucleate Boiling", Wikipedia, https//en.wikipedia.org/wiki/Nucleate_boiling. Sep. 2, 2015, pp. 1-5.

Jung et al., "Observations of the Critical Heat Flux Process During Pool Boiling of FC-72", Journal of Heat Transfer, vol. 136, (Apr. 2014) 041501. Downloaded from: http://heattransfer.asmedigitalcollection.asme.org/.

Kutateladze, S.S. "Boiling Heat Transfer" Unedited Rough Draft Translation 270076, FTD-IT-62-52/1+2+4. Paper for presentation at Heat Transfer Conference, Jun. 5-10, 1961, at Minsk, USSR, pp. 1-39.

(Continued)

*Primary Examiner* — Helene Klemanski
(74) *Attorney, Agent, or Firm* — Robert J. Hampsch

(57) ABSTRACT

A porous metallic coating is provided. The coating is characterized by a combination of optimized properties that improve coating performance, as measured by heat transfer efficiency. The porous coating has optimal ranges for properties such as porosity, particle size and thickness, and has particular applicability in boiling heat transfer applications as part of an air separations unit. The porous coatings are derived from slurry-based formulations that include a mixture of metallic particles, a binder and a solvent.

20 Claims, 4 Drawing Sheets

(56) References Cited

U.S. PATENT DOCUMENTS

2010/0231433 A1    9/2010   Tishin
2010/0294475 A1   11/2010   Rush
2017/0108296 A1    4/2017   Kwark

OTHER PUBLICATIONS

Priarone, A, "Effect of surface orientation on nucleate boiling and critical heat flux of dielectric fluids", International Journal of Thermal Sciences, 44, (2005), pp. 822-831, (no month available).

* cited by examiner

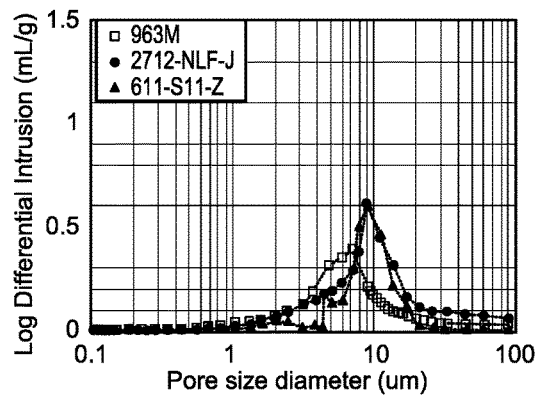
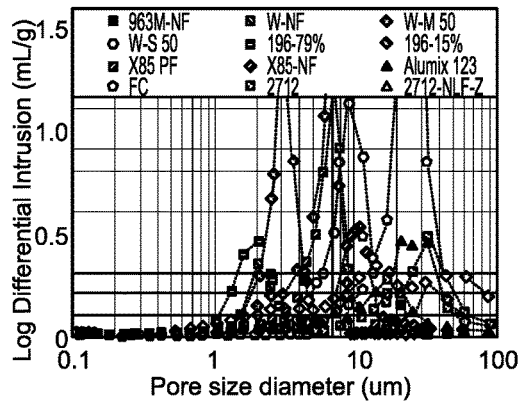
Pore Size Distribution of Samples by Mercury Porosimetry
FIG. 3A  FIG. 3B
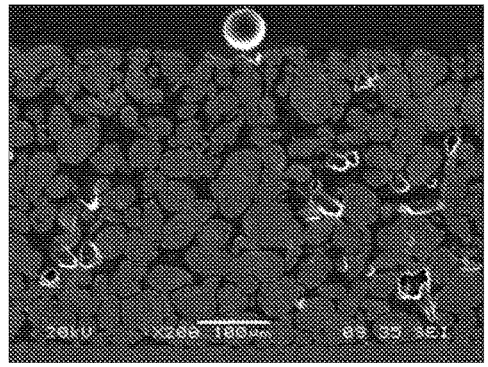
611-S11-Z Coating Morphology
FIG. 4
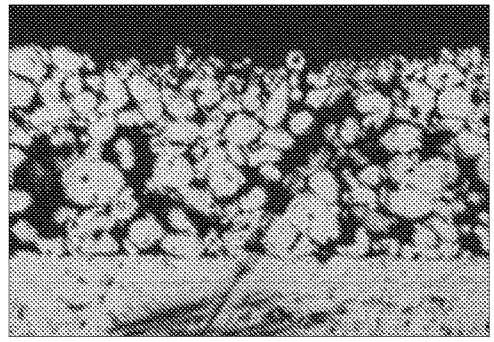
2712-NLF-J Coating Morphology
FIG. 5

FIG. 6A   FIG. 6B   FIG. 6C
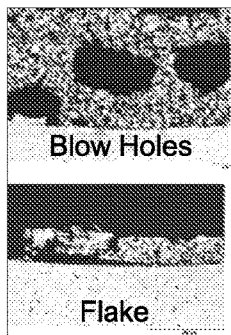 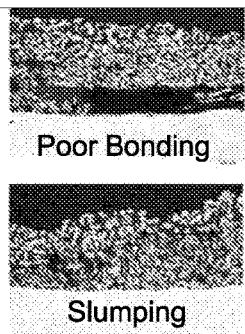 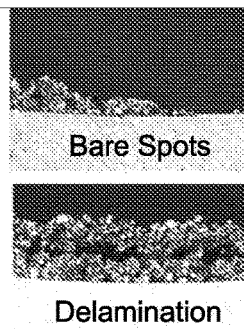
FIG. 6D   FIG. 6E   FIG. 6F
Typical Porous Coating Defects
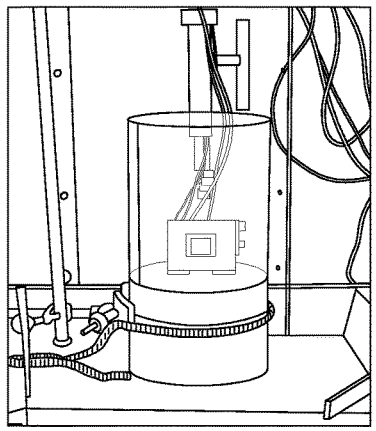
Pool Boiling Rig with Test Specimen Loaded Inside Dewar
FIG. 7
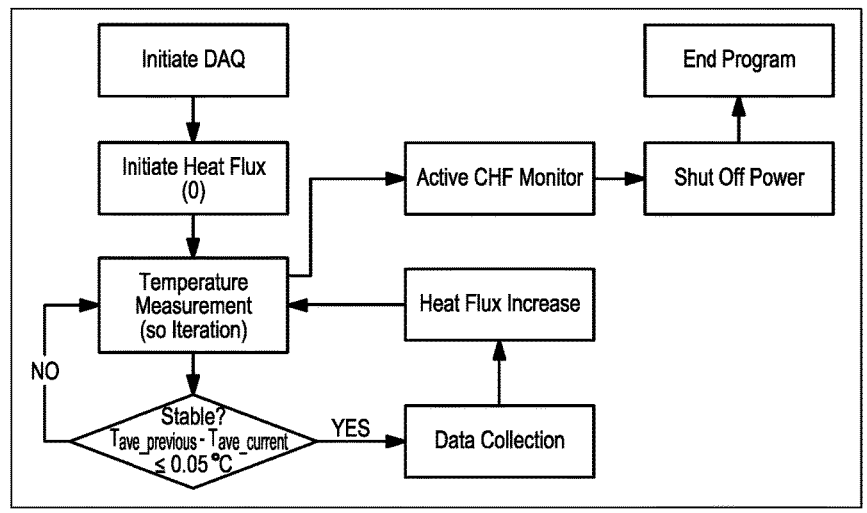
Test Flow Diagram for Pool Boiling Performance Test
FIG. 8

AIR SEPARATION UNIT HEAT EXCHANGER WITH POROUS BOILING SURFACE COATINGS

CROSS REFERENCE TO RELATED APPLICATIONS

The present application is a continuation application that claims the benefit of and priority to U.S. patent application Ser. No. 14/884,087 filed on Oct. 15, 2015, now U.S. Pat. No. 10,047,880.

FIELD OF THE INVENTION

This invention relates to novel slurry and metallic porous coating compositions along various surfaces to enhance heat transfer. More particularly, the coating compositions optimized to improve the performance of various cryogenic boiling applications.

BACKGROUND OF THE INVENTION

Heat exchangers are utilized in a variety of industrial processes to transfer heat between two or more fluids by indirect heat exchange. There are different designs for heat exchangers. For instance, one heat exchanger design is commonly referred to as a shell and tube design in which one fluid flows through the tubes and another fluid flows outside the tubes but inside a shell housing that retains the tubes. The fluid can be a liquid, vapor or a combination thereof. Further, the shell can be formed by or integrated with other equipment in which the heat transfer is to be conducted, such as, for example, a distillation column.

In another type of design, known as a plate-fin heat exchanger, a series of plates, referred to commonly as parting sheets, are connected at their respective edges by end bars and fins to enhance the heat transfer between the plates. Header tanks connected to the plates introduce the process or working fluids into the passages formed between the plates to accomplish the indirect heat exchange between the fluids.

Where one of the fluids is a liquid to be boiled at a boiling side surface of the heat exchanger, a porous coating can be used along the boiling side surface to promote the increase of heat transfer through a given surface, per unit surface area, (i.e., heat flux) in response to a given temperature difference between the heat source input and the fluid to enable the fluid to boil. The term "porous coating" as used herein and throughout refers to those coatings that by virtue of its built-in porosity enhance boiling by providing so-called nucleation sites. The porous coating provides micro-scale cavities that have the effect of increasing the number of nucleation sites and bubble departure frequency per site. As a result, the boiling rate can be enhanced.

However, currently available porous coatings, such as those mentioned in U.S. Pat. No. 4,917,960, are inefficient, particularly for cryogenic boiling heat transfer applications. Heat transfer efficiency is generally used to assess the performance of the porous coatings. As used herein and throughout the specification, the performance is defined by a temperature difference, $\Delta T$, that is equal to T1-T2, where T1 is defined as the temperature of the heat source input and T2 is defined as the temperature of the process fluid to be heated to its predetermined temperature (e.g., boiling point). A coating with a relatively lower $\Delta T$ would be considered better performing, by virtue of its ability to promote greater heat transfer to the process fluid for a given heat source input (e.g., a gas located on the shell side of a shell and tube heat exchanger design having a temperature, T1, greater than that of the process fluid, T2, flowing within the tube of the shell and tube heat exchanger). Improved performance is defined at least in part by a reduction in the $\Delta T$. It should be understood that heat transfer efficiency as used herein and throughout the specification may be used to assess coating performance for boiling heat transfer applications. As will be explained in greater detail below, heat transfer efficiency will be used to assess coating performance of porous coatings for various applications, including boiling heat transfer applications, whereby heat is transferred from a heat source or heat source input to a fluid to cause boiling of the fluid. For boiling heat transfer applications, the term "boiling $\Delta T$" may be used herein and throughout. It should be understood that the term "$\Delta T$" and "boiling $\Delta T$" may be used interchangeably herein and are intended to have the same meaning.

Generally speaking, conventional porous coatings suffer from an unacceptably high $\Delta T$. In other words, a large amount of heat energy is required to be transferred to the boiling surface to boil the process fluid, which translates into inefficient processes having excessive power consumption.

These conventional porous coatings do not sufficiently increase or enhance heat transfer efficiency to the boiling surface, as required by today's more demanding applications. Further, such conventional porous coatings may not have the ability to facilitate the onset of nucleation boiling, by, for example, increasing the number of nucleation sites for boiling to occur. Generally speaking, the heat transfer and especially the boiling heat transfer increases in direct proportion to the number of active bubble column sites.

Today's heat transfer coatings have attained a maturity level where further increase in performance, efficiency and operational cost savings are not technically feasible. In view of these shortcomings, and the ever increasing need for improved performance, there is a need for new generation coating compositions that can enhance heat transfer for various applications.

SUMMARY OF THE INVENTION

In a first aspect of the present invention, a porous coating applied onto a substrate is provided comprising: metallic particles comprising aluminum, magnesium and tin, wherein the aggregate amount of magnesium and tin is not greater than 15 wt %, based on the weight of the porous coating, and the balance is aluminum; wherein the porous coating has an average particle diameter ranging from about 35 to about 55 µm; a thickness ranging from about 300 to about 400 µm; a median pore diameter ranging from about 7 to about 12 µm; and an overall porosity ranging from about 40% to about 60% based on the overall volume of the coating.

In a second aspect of the present invention, a porous coating applied onto a substrate derived from a slurry formulation, said slurry formulation comprising: a mixture of metallic particles having a predetermined size range and shape to create an optimal pore size and optimal pore size distribution, said mixture of metallic particles comprising aluminum, magnesium and tin, wherein said magnesium ranges between about 0.04 to about 10 wt % and said tin is present in an amount of about 0.02 to about 5 wt % based on a weight of the slurry, and said aluminum ranges from about 40 to about 70 wt %, based on the weight of the slurry; wherein said slurry is characterized by the absence of a fugitive material; an organic binder to bind the metallic particles, said organic binder selected from the group consisting of polyvinyl butyral (PVB), polyvinyl alcohol, cellulose, starch, and any combination thereof; a solvent selected from the group consisting of water, ethanol and isopropanol (IPA).

The invention may include any of the aspects in various combinations and embodiments to be disclosed herein.

BRIEF DESCRIPTION OF THE DRAWINGS

The objectives and advantages of the invention will be better understood from the following detailed description of the preferred embodiments thereof in connection with the accompanying figures wherein like numbers denote same features throughout and wherein:

FIG. 3a and FIG. 3b shows pore size distribution of samples obtained by mercury porosimetry;

FIG. 4 is a scanning electron microscopy of a coating of the present invention;

FIG. 5 is a scanning electron microscopy of a coating of the present invention;

FIGS. 6a, 6b, 6c, 6d, 6e and 6f illustrates typical coating defects in conventional porous coatings including blow holes (FIG. 6a); poor bonding (FIG. 6b); bare spots (FIG. 6c); flakes (FIG. 6d); slumping (FIG. 6e); and delamination (FIG. 6f);

FIG. 7 shows the pool boiling rig set-up utilized for evaluating coating performance; and FIG. 8 shows the test flow diagram for the pool boiling performance test.

DETAILED DESCRIPTION OF THE INVENTION

Figure 1:
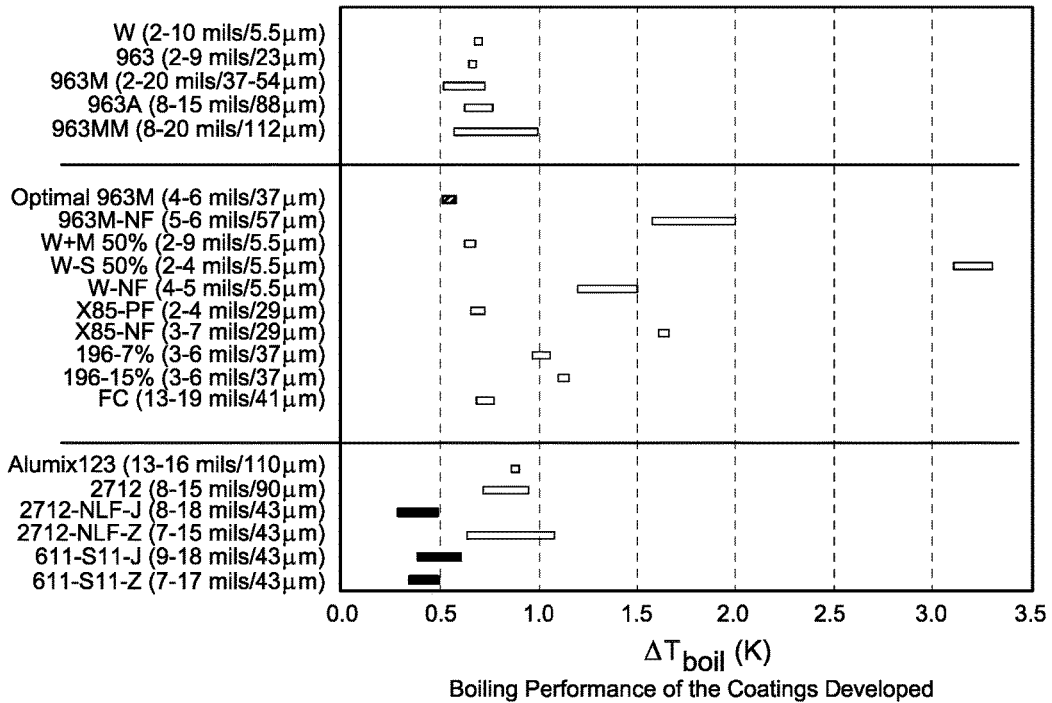
FIG. 1 illustrates a comparison of boiling performance of various coatings developed and evaluated.

The advantages of the invention will be better understood from the following detailed description of the embodiments thereof in connection. The disclosure is set out herein in various embodiments and with reference to various aspects and features of the invention. It will be understood that the particular slurry and coating composition and its various properties embodying the present invention are shown by way of illustration and not as a limitation of the present invention. The principals and features of this invention may be employed in various and numerous embodiments in various permutations and combinations without departing from the scope of the invention. The disclosure may further be specified as comprising, consisting or consisting essentially of, any of such combinations and permutations of these specific features, aspects, and embodiments, or a selected one or ones thereof.

All percentages are expressed herein as weight percentages except for porosity, which is expressed as volume-based. "Slurry" as used herein and throughout the specification means that the metallic, ceramic or other types of powders are mixed with a binder and a carrier or solvent to create a slurry formulation with a predetermined viscosity suitable for the substrate it is coated therealong. "Substrate" as used herein and throughout the specification means any surface to which a coating can be applied, including by way of example, a heat transfer surface, such as the surface of an inner diameter and/or outer diameter of a conduit of a heat exchanger tube. "Conduit" refers to any type of tubular-like structure of any shape, including, by way of example, a tube, pipe, channel, duct or trough.

In one aspect, the present invention relates to a slurry material that is particularly well suited in the production of a new porous coating having improved performance over commercially available porous coatings for heat transfer applications. The slurries generally consist of metallic particles, a binder and a solvent. As will be explained, extensive screening of different slurry formulations to create resultant coating compositions were performed to understand which properties of the slurry and corresponding coating resulted in enhance performance. Thereafter, the key properties were further examined to develop an optimized slurry formulation and coating composition having specific properties capable of improved performance.

The metallic particles of the present invention may be present in any form or a combination of different forms. For example, metal flakes can be used to prepare the slurry material. In a preferred embodiment, powder having a substantially spherical-based shape is utilized to prepare the inventive slurry material. Suitable metallic materials may be used, such as Fe, Cu, Zn and Al. Preferably, the metallic particles are aluminum-based alloy. Alternatively, the metallic powders may comprise pure aluminum. The present invention recognizes that the powder particle size distribution and particle shape can significantly affect coating performance (i.e., enhance heat transfer efficiency by reducing $\Delta T$). The size and shape of the metallic particles in the slurry formulation has been observed by the inventors to substantially affect the packing of the particles within the coating layer. The packing of the particles impacts the coating characteristics, including, porosity, pore size distribution and thickness. On the contrary, it should be noted that representative porous materials such as those disclosed in U.S. Pat. No. 4,917,960 have tended to rely on fugitive materials to induce the desired porosity in the coating. However, the present invention is characterized by the absence of a fugitive, as the present invention is able to rely on particle size and particle shape to create the necessary porosity that contributes to improved performance. In this regard, and in accordance with the principles of the present invention, powder comprising particles of a certain prescribed size range and shape is selected to form a uni-modal particle size distribution. As will be shown, the selection of the powder within the prescribed particle size range and shape has been determined by the inventors to enhance coating performance.

The slurry may further include an organic binder. The organic binder used herein can effectively bind the metallic particles together and retain the resultant coating's structural integrity during service life of the substrate. The organic binder also helps to bond the metal particles prior to sintering as well as control viscosity of the slurry to form the coating with a controlled thickness. The binder may be aqueous-based or solvent-based. Suitable binders include polyvinyl butyral (PVB), polyvinyl alcohol (PVA), cellulose, starch, and any combination thereof.

In a preferred embodiment, the slurry material has a formulation defined by a mixture of metallic powders, an organic binder, and a solvent. The metallic powders may include at least the following elements: Mg powder ranging from about 0.04 to about 10 wt %, and preferably from about 0.1 to about 7 wt %; Sn powder ranging from about 0.02 to about 5 wt %, and preferably from about 0.1 to about 3.5 wt %; and aluminum-containing powder from about 40 to about 70 wt %. The Mg and Sn can be included to serve as binding agents which can assist in sintering of the Al powder during heating. The organic binder preferably includes PVB in an amount from about 0.1 to about 5 wt %. Other suitable organic binders may be used, including, but not limited to, PVA, cellulose or starch. The solvent may be aqueous-based or organic-based in a range between about 30 to about 60 wt %. Suitable examples include water, ethanol or isopropanol. Isopropanol (IPA) is preferably utilized and present in an amount from about 30 to about 60 wt %. The overall concentration of the metal powder, binder and solvent are selected within the prescribed ranges to form the total slurry formulation (i.e., 100 wt % based on the weight of the slurry). In one example, the slurry has a formulation of about 50 to about 55 wt % Al powder; about 0.5 to about 2 wt % Mg; 0.55 wt % or less Sn; about 2 wt % or less PVB; and about 35 to about 50 wt % IPA solvent. The overall concentration of the constituents are selected within the prescribed ranges to form the total slurry formulation (i.e., 100 wt % based on the weight of the slurry). The constituents are mixed together to form a slurry having a predetermined viscosity. Coatings created by this slurry formulation are designated as "611-S11-Z" and will be referred to as such for ease of identification during the screening performed and described herein by the Applicants.

In another preferred embodiment, the slurry material has a formulation defined by a mixture of about 40 to about 70 wt % Al powder; about 30 to about 60 wt % ethanol; about 0.1 to about 5 wt % hydroxypropyl cellulose; about 0.5 to about 5.0 wt % of Cu; about 0.5 to about 5 wt % of Mg, about 0.1 to about 2 wt % of Si and less than about 1 wt % of Sn; and 0 to about 20 wt % of a defoaming agent (e.g., commercially available MD-20 defoamer). The overall concentration of the Al powder, binder, solvent and optional defoamer are selected within the prescribed ranges to form the total slurry formulation (i.e., 100 wt % based on the weight of the slurry). In one example, the slurry formulation is about 50 to about 55.5 wt % Al alloy containing powder with about 3.6 to about 4.0 wt % Cu, about 0.8-1.2 wt % Mg and about 0.6-0.9 wt % Si; 44.2 wt % ethanol; 0.3 wt % hydroxypropyl cellulose; and 1-2 drops (i.e., less than 1 wt %) of the MD-20 defoamer. The constituents are mixed together to form a slurry having a predetermined viscosity. Coatings created by this slurry formulation are designated as "2712-NLF-J" which will be referred to as such for ease of identification during the screening and optimization tests performed by the Applicants. The slurry is preferably pre-mixed and can then be applied onto a substrate, preferably by the rolling methods described in co-pending application, U.S. patent application Ser. No. 14/884,171, the contents of which are hereby incorporated herein by reference in its entirety. However, it should be understood that any suitable method can be utilized to produce the porous coatings of the present invention, including dipping or spreading, both of which are generally followed by suitable heat treatment steps as commonly known in the art.

The coating of the present invention is characterized by certain particle sizes and coating properties. In accordance with the principles of the present invention, the coating has a particle size defined at least in part by a mean average particle diameter ranging from about 35 to about 55 µm; a thickness ranging from about 10 to about 16 mils (i.e., about 250 to about 400 µm); a median pore diameter ranging from about 7 to about 12 µm; and an overall porosity ranging from about 40% to about 60% based on the overall volume of the coating. Preferably, the coating has a particle size defined at least in part by an average particle diameter ranging from about 38 to about 43 µm; a thickness ranging from about 12 to about 16 mils (i.e., about 300 to about 400 µm); a median pore diameter ranging from about 7 to about 10 µm; and an overall porosity ranging from about 40% to about 55% based on the overall volume of the coating. The coating has a composition derived from the aforementioned slurry formulations. The coating composition after sintering has a composition that includes Al, Mg, Sn and optional amounts of Cu, Si and Fe. In one embodiment, the Mg ranges from about 0.1 wt % to about 10 wt %, preferably about 0.5 wt % to about 5 wt %, and more preferably about 1 to about 2.5 wt %; the Sn ranges from about 0.1 wt % to about 5 wt %, preferably from about 0.5 wt % to about 3.5 wt %, and more preferably from about 0.75 to about 1.5 wt %; Cu ranges from about 0 to about 5 wt %; Si ranges from about 0 to about 1 wt %; Fe ranges from about 0 to about 1 wt %; and the balance is aluminum. In another embodiment, the Mg ranges from about 0.1 wt % to about 5 wt %, the Sn ranges from about 0.1 wt % to about 3 wt % and the balance is aluminum. It would be understood that exact values are dependent upon the end-use application and the resultant type of coating composition being utilized (e.g., 2712-NLF-J or 611-S11-Z).

In a preferred embodiment, the substrate is a heat exchanger surface, and more preferably a surface of an inner diameter and/or outer diameter of a conduit of a heat exchanger tube utilized for boiling surfaces, such as in relation to a main condenser of an air separations unit for cryogenic applications. Other non-cryogenic applications may be applicable for the present invention.

To arrive at the optimal porous coating characteristics derived from the inventive slurries, an extensive screening of a wide array of coatings was conducted to determine those coating candidates exhibiting improved performance over conventional coatings. More than 20 different coatings were developed using various slurries that consist of various particle sizes and particle size distributions, different binders and different solvents/carriers. A design of controlled experiments was performed to ascertain those porous coating characteristics that had an observable effect on performance. Subsequently, these identified porous coating characteristics were optimized to yield improved performance in comparison to conventional porous coatings. Through the screening process, the optimal coating specification was determined from starting slurry materials. As will be shown, the screening indicated that the boiling heat transfer efficiency was dependent upon a combination of particle sizes; particle size distribution; and coating thickness so as to produce a porous coating with optimal pore size, number of pores and pore size distribution.

FIG. 1 shows a snap shot of the boiling performance of porous coatings which were tested. All coatings shown in FIG. 1 were developed by the inventors as part of the extensive screening for suitable coating candidates. FIG. 1 indicates the materials tested along with the thickness range (designated by the first number in brackets) and the mean average particle size (designated by the second number in brackets).

Figure 2:
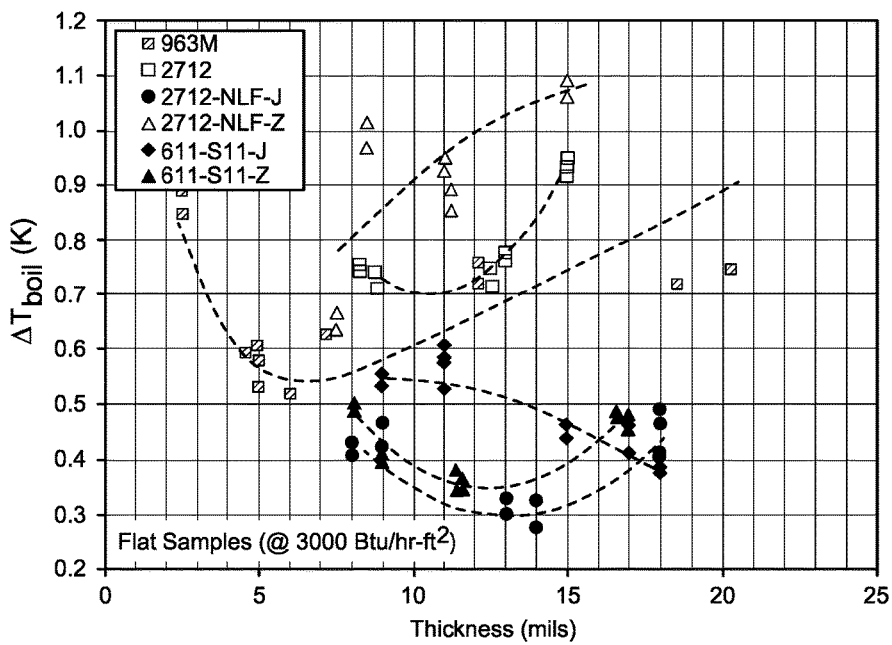
FIG. 2 illustrates boiling performance at various thicknesses of coatings selected from FIG. 1.

The boiling performance for FIG. 1 and FIG. 2 was determined by conducting a so-called "pool boiling" test, the details of which will be explained below in connection with the Examples. As mentioned hereinbefore, the performance of the porous coatings is defined by a temperature difference, $\Delta T$ that is equal to T1-T2, where T1 is defined as the temperature of the heat source and T2 is defined as the temperature of the process fluid to be heated to its predetermined temperature, which is preferably the fluid's boiling point (saturated at 1 atm). A coating with a relatively lower $\Delta T$ would be considered better performing, by virtue of its ability to promote greater heat transfer to the process fluid for a given input of heat source.

FIG. 1 indicates that 611-S11-J, 611-S11-Z and 2712-NLF-J showed better boiling performance than the other coatings in the table. In particular each of the coatings exhibited lower ΔT boiling performance and less variation in the ΔT. It should be noted that a reduction in ΔT of 0.1K is significant. Specifically, a 0.3K reduction in the top ΔT of the main condenser of an air separation unit is equivalent to approximately a power saving of 0.5% in the total compression power (i.e., ~$7-$8 MM capitalized value). The power savings for an air separation unit (ASU) as a result of the inventive features of the coatings of the present invention are substantial.

Having identified potentially three suitable coating candidates, the porous coating characteristics were optimized to yield improved performance in comparison to a selection of some of the conventional porous coatings and internally developed coatings by the inventors listed in FIG. 1. The effects of coating thickness were investigated to identify whether an optimum range of thickness could be identified for each of the coatings. FIG. 2 shows the results obtained for the boiling ΔT at a heat flux input of 3000 BTU/hr-ft². The 611-S11-J (diamond-shape) was observed to require a relatively increased thickness between 20 to about 25 mils at which ΔT would decrease. However, the inventors noted that higher a thickness begins to compromise coating morphology, as blow holes shown in FIG. 6a and other coating defects as shown in FIG. 6 tend to be created at such higher thickness. For example, other coating defects may include poor bonding (FIG. 6b); bare spots (FIG. 6c); flakes (FIG. 6d); slumping (FIG. 6e); and delamination (FIG. 6f). Consequently, 611-S11-J was eliminated as a suitable candidate. The present invention recognizes, as confirmed by the results, that a favorable ΔT is necessary but does not ensure an optimal porous coating when the coating thickness is relatively high so as to increase the tendency for coating defects, such as those illustrated in FIG. 6a, 6b, 6c, 6d, or 6e.

The remaining two coatings, 611-S11-Z and 2712NLF-J, do show an optimal thickness range at which performance can be improved. The data indicates that thickness needs to be greater than a critical threshold to create improved heat transfer efficiency (i.e., a trend toward decreased ΔT) but below an upper limit at which ΔT is observed to increase (performance degradation) and coating morphology defects, such as blow holes and slumping, may tend to appear. FIG. 2 clearly shows that the performance for 611-S11-Z and 2712-NLF-J outperform the other screened coatings, regardless of coating thickness. Next, pore size characteristics were evaluated with the objective of identifying the pore size and any type of a distinct and discernible pore size distribution which may be contributing to the improved performance of 611-S11-Z and 2712NLF-J. Mercury porosimetry was utilized to correlate the level of mercury intrusion (defined as volume per unit weight) into various pore sizes and on such basis generate pore size distribution and identify a median pore size diameter. FIG. 3a indicates that both 611-S11-Z and 2712NLF-J have a similar median pore size of about 10 μm and similar pore size distribution, which appears to be normal in a log scale. Prior to the present invention, there has been no recognition or understanding of optimal pore sizes or the criticality of pore size distribution in combination with particle size and thickness to improve coating performance. FIG. 3b shows pore size results for other candidates initially considered in FIG. 1 but not given further consideration. The pore sizes and distributions are different from those of FIG. 3a. In particular, the coatings of FIG. 3b have wider spread pore size distributions; skewed distributions and/or higher intrusion volumes relative to those in FIG. 3a. The results indicate that the pore size and pore size distribution play a role in performance. However, while similar pore size and distribution is required, the present invention recognizes that a coating with such pore size and pore size distribution does not ensure good performance. In this regard, 963M, which exhibits similar pore size and pore size distribution, does not show favorable ΔT performance and consistency (FIGS. 1 and 2).

The exact values for the coating properties depend on a variety of factors, including the fluid to be boiled; the type of heat exchanger utilized; and the heat source input. For example, when the fluid is oxygen liquid to be boiled utilizing a shell and tube heat exchanger, the coating of the present invention preferably has a median pore diameter ranging from about 8 μm to about 12 μm; a coating thickness ranging from about 300 to about 400 μm; and a porosity ranging from about 40 wt % to about 60 wt % based on total volume of coating. The coating composition is a mixture of metallic particles comprising aluminum, magnesium and tin, wherein the aggregate amount of magnesium and tin is not greater than 15 wt %, based on the weight of the porous coating, and the balance is aluminum. Preferably, the Mg ranges from about 0.1 wt % to about 10 wt %, the Sn ranges from about 0.1 wt % to about 5 wt % and the balance is aluminum. More preferably, the Mg ranges from about 1 wt % to about 3 wt %, the Sn ranges from about 0.5 wt % to about 2 wt % and the balance is aluminum.

The following tests described below were performed by the inventors to assess performance of the coatings of the present invention with conventional coatings and commercially available coatings. Coating performance was assessed by a pool boiling performance test, which is known in the industry to assess the heat transfer efficiency of a coating. The methods for performing such pool boiling performance tests are well known and documented in the published literature, including A. Priarone, *Effect of surface orientation on nucleate boiling and critical heat flux of dielectric fluids*, International Journal of Thermal Sciences, 44, 2005, pp 822-831; and Jung et al., *Observations of the Critical Heat Flux Process During Pool Boiling of FC-72*, Journal of Heat Transfer, 135 (4), 041501, January 2014. A schematic of the two test specimens used for the pool boiling performance test is shown in FIG. 9.

Figure 9:
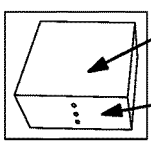
FIG. 9 is a test heater assembly for flat square and circular samples.

A summary of the test specimens is shown in FIG. 9.

One of the heater assemblies consisted of a flat square aluminum block ("block"). The other heater assembly consisted of a cylindrical tube aluminum block ("tube"). The tubes were then mounted onto the circular shape base blocks (see Table 1). Both heater assemblies included a heating element, G10 substrate, Stycast epoxy and wires.

Fabrication of both of the heater assemblies was as follows. Both the block and the tube were coated on one surface with the porous coating to be evaluated. The block was coated on the top surface. The tube was coated along its inner diameter. The other surface of the block and tube were plated with Nickel onto which a heating square-shaped resistor (10Ω) was attached by soldering. The block and resistor assembly were then placed on the G10 substrate with the coated side up for the block as shown in Table 1 below. Similarly, the tube and resistor assembly were placed on the G10 substrate as shown in Table 1 below. Stycast® cryogenic epoxy was then carefully distributed around the perimeter of the block assembly and the tube assembly to expose only the top (1"×1") surface. The epoxy and the substrate also functioned as insulators by preventing heat loss through the sides and bottom and ensuring that heat from the resistor was directed to the porous coating. Temperature measurements were obtained using T-type thermocouples that were embedded in the block and tube. Three T-type thermocouples were embedded and located below the heater surface with ⅛" interval from the surface as shown in Table 1. A RTD type thermocouple was also used to measure the bulk temperature for calibration of the temperature measurements.

As a test pool, stainless steel and glass dewars were used. The glass dewar was used to visualize the liquid nitrogen boiling as needed during the test. It needs to be noted that the performance results are only valid for relative comparison due to the fact that the boiling performance is dependent upon the heat flux which is dependent on test heater geometry (e.g., flat vs. circular).

Each of the fabricated heater assemblies were loaded inside a respective dewar. FIG. 7 shows a representative set-up of the block heater test assembly loaded inside the dewar.

The dewar was then filled with liquid nitrogen to 70% of the dewar height (i.e., 12 inches). When the temperatures of both the test heater assembly and the bulk liquid nitrogen reached saturated conditions (i.e., steady state at −320 F), the pool boiling experiments were initiated. The experiments were controlled and monitored using a program created in LabVIEW. The program controlled a National Instruments Compact DAQ data acquisition system (cDAQ-917) and an Agilent N5749A power supply (750 W maximum power) to generate heat-flux-controlled boiling curves. This was achieved by incrementally raising the heat flux and then allowing for the test heater temperature to reach equilibrium before proceeding to the next heat flux increment. The process was repeated up to the so-called "critical heat flux" ("CHF"). The onset of the CHF was identified by a sudden and drastic rise in temperature at an elevated heat flux. Upon reaching the CHF, the program shut down power to the test heater and saved all the data to a file. All tests were conducted at 1 atmospheric pressure. A test flow diagram is shown in FIG. 8. The Glass dewar was used to capture the boiling behavior (e.g., partial boiling) with a high speed camera.

The following examples are intended to provide a basis for comparison of the present invention coatings, with commercially available ones and other coating candidates, but they are not construed as limiting the present invention.

Example 1 (611-S11-Z)

Coating 611-S11-Z was prepared from a slurry having the following constituents: 66 wt % aluminum powder (commercially available as Ampal® 611); 0.67 wt % Mg; 0.34 wt % Sn; 2 wt % PVB; and 30 wt % IPA solvent. The median particle size was approximately 43 μm. The slurry constituents were thoroughly mixed. The slurry was then applied onto the substrate by dip coating.

A drying process for IPA solvent evaporation was performed at ambient temperature for about 30 minutes. Next, the binder PVB was burned by heating the coating in a furnace at 450° C. for 1 hour in air, followed by sintering at 580° C. for 1 hour in nitrogen. The microstructure was visually observed SEM as shown in FIG. 4. SEM as shown in FIG. 4. The resultant coating morphology is shown in FIG. 4. No coating defects as shown in FIG. 6a, 6b, 6c, 6d, or 6e were observed. The median pore size was about 10 μm and the pore size distribution was determined to be normally distributed as shown in FIG. 3a.

Example 2 (611-S11-Z Coating Performance)

The porous coating of Example 1 was evaluated for performance by conducting the pool boiling experiment as described above. The test heater assembly (Table 1) was prepared with the porous coating of Example 1. The heater assembly was then loaded inside a dewar as shown in FIG. 7. The pool boiling experiment was initiated as shown in FIG. 8. The boiling ΔT was obtained at a heat flux of 3000 Btu/hr-ft$^2$. The results for 611-S11-Z are shown in FIG. 1.

Additional boiling experiment tests using 611-S11-Z were conducted to evaluate the effects of coating thickness. The results are shown in FIG. 2. 611-S11-Z displayed the best results at a coating thickness of about 330 μm. 611-S11-Z outperformed the other screened coatings at all thicknesses.

Example 3 (2712-NLF-J)

Coating 2712-NLF-J was prepared from a slurry having the following constituents: 55 wt % commercially available Ampal® 2712 aluminum alloy powder containing 0.8-1.2 wt % Mg; 3.6-4.0 wt % Cu; 0.6-0.9 wt % Si; 44 wt % ethanol; 0.27 wt % hydroxypropyl cellulose; and 1-2 drops of a defoaming agent (commercially available as MD-20). The median particle size was approximately 43 μm. The slurry constituents were thoroughly mixed. The slurry was then applied onto the substrate by dip coating.

Drying process for solvent evaporation was performed at ambient temperature for about 30 minutes. Next, the binder was burned by heating the coating in a furnace at 450° C. for 1 hour in air, followed by sintering at 620° C. for 1 hour in nitrogen. The microstructure was visually observed by SEM as shown in FIG. 5. The resultant coating morphology is shown in FIG. 5. No coating defects as shown in FIG. 6a, 6b, 6c, 6d, 6e or 6f were observed. The median pore size was about 10 μm and the pore size distribution was determined to be normally distributed as shown in FIG. 3a.

Example 4 (2712-NLF-J Coating Performance)

The porous coating of Example 3 was evaluated for performance by conducting the pool boiling experiment as described above. The test heater assembly (Table 1) was prepared with the porous coating of Example 3. The heater assembly was then loaded inside a dewar as shown in FIG. 7. The pool boiling experiment was initiated as shown in FIG. 8. The boiling ΔT was obtained at a heat flux of 3000 Btu/hr-ft$^2$. The results for 2712-NLF-J are shown in FIG. 1.

Additional boiling experiment tests using 2712-NLF-J were conducted to evaluate the effects of coating thickness. The results are shown in FIG. 2. 2712-NLF-J displayed the best results at a coating thickness of about 350 μm. 2712-NLF-J outperformed the other screened coatings at all thicknesses. Performance was comparable to that of the coating of Example 1.

Example 5 (Heat Flux Sensitivity)

The performance sensitivity of the coatings of Example 1 (611-S11-Z) and Example 3 (2712-NLF-J) to various heat fluxes was evaluated. Heat fluxes at 2000 and 5000 Btu/hr-ft$^2$ were assessed. It was determined that the 611-S11-Z and the 2712-NLF-J coatings exhibited improved performance at 2000 and 5000 Btu/hr-ft² relative to the other coatings of FIG. 1 at all coating thicknesses that were tested.

Example 6 (Pore Size/Mercury Porisometry)

The effect of pore size was evaluated for various coatings listed in FIG. 1. Mercury porosimetry was performed to identify three-dimensional median pore size and volumetric pore size distribution.

Free standing coating samples were prepared for the coatings that were previously used for the pool boiling experiments. According to the standardized protocol, each coating sample was loaded with a fixed amount of mercury. Pressure was applied after loading so as to squeeze the mercury downward into the pores of the coating samples. The pressure caused some of the mercury to be squeezed into certain size pore diameters. The mercury porosimetry device captured and analyzed the volume of mercury intruded into the sample for the applied pressure. This information was then utilized to estimate how many pores of a certain size at a particular pressure were available. The pressure was then increased and/or decreased to continue to determine the balance of the pore size distribution contained inside the coating structure for each of the coating samples listed in FIGS. 3a and 3b.

As can be seen, the improved porous coatings of the present invention have a combination of certain coating properties that have been optimized for a particular composition which leads to improved performance over conventional porous coatings. Such improved boiling surface requires relatively less heat input to the boiling surface to boil the process fluid, which translates into more efficient processes requiring less power consumption. In a preferred embodiment, the coatings of the present invention improve heat transfer efficiency in boiling applications as part of an air separation unit. As an example, oxygen may be fed through a shell and tube heat exchanger and nitrogen gas may be flowing outside the tube along the shell side and serve as the heat input. The inventive porous coatings are contained along the surface of the inner diameter of the tubes so as to enhance heat transfer efficiency across the tubes to the oxygen in the nucleate boiling regime. Less energy is required to boil the oxygen, as the temperature difference between the nitrogen and oxygen (i.e., ΔT) is lower in comparison to conventional porous coatings along the surface of the inner diameter of the tubes. The reduction in ΔT translates into less pressure of nitrogen required in the condenser which means less pressure in the lower column of the heat exchange system for the ASU. Less pressure in the lower column translates into less head pressure for the main air compressor system of the ASU. It should be understood that the coatings of the present invention are applicable for other cryogenic fluids and other fluids having low surface tension fluids, such as, by example, refrigerants for automotive and HVAC applications.

Further, the test results indicate that the porous coatings of the present invention are able to improve performance for flat surfaces as well as surfaces of an inner diameter that are about 1 inch or less. The ability for the inventive coatings to enhance performance of a wide array of geometries and end-use applications is a distinct advantage over conventional porous coatings.

While it has been shown and described what is considered to be certain embodiments of the invention, it will, of course, be understood that various modifications and changes in form or detail can readily be made without departing from the spirit and scope of the invention. It is, therefore, intended that this invention not be limited to the exact form and detail herein shown and described, nor to anything less than the whole of the invention herein disclosed and hereinafter claimed.

The invention claimed is:

1. A heat exchange surface in an air separation unit, comprising:
    a substrate;
    a porous coating applied to a surface of the substrate, the porous coating comprising aluminum, magnesium and tin metallic particles, wherein the aggregate amount of magnesium metallic particles and tin metallic particles is not greater than 15 wt % of the weight of the porous coating, and wherein the aggregate amount of metallic particles that are aluminum or aluminum alloys is greater than 78 wt %;
    wherein the porous coating has an average particle size diameter ranging from about 35 μm to about 55 μm;
    wherein the porous coating has a thickness ranging from about 300 μm to about 400 μm;
    wherein the porous coating has a median pore diameter ranging from about 7 μm to about 12 μm; and
    wherein the porous coating has an overall porosity ranging from about 40% to about 60% based on the overall volume of the porous coating.

2. The heat exchange surface of claim 1, characterized by the absence of a fugitive in the porous coating.

3. The heat exchange surface of claim 1, wherein the porous coating optionally includes metallic particles of copper, iron, or silicon, and wherein the aggregate amount of metallic particles that are copper, iron or silicon is less than 7 wt %.

4. The heat exchange surface of claim 1, wherein the porous coating has an average particle diameter ranging from about 38 μm to about 43 μm, a median pore diameter ranging from about 7 μm to about 10 μm, and an overall porosity ranging from about 40% to about 55% based on the overall volume of the porous coating.

5. The heat exchange surface of claim 1, wherein the magnesium metallic particles range from about 0.1 wt % to about 10 wt % of the porous coating, and the tin metallic particles range from about 0.1 wt % to about 5 wt % of the porous coating.

6. The heat exchange surface of claim 1, wherein the heat exchange surface is a boiling surface in a main condenser of the air separation unit and is configured to boil oxygen.

7. The heat exchange surface of claim 1, wherein the surface of the substrate is an inner surface of a heat exchanger tube.

8. The heat exchange surface of claim 7, wherein the heat exchange tube further includes a heat input surface that forms an outer surface of the heat exchange tube configured to transfer heat from a nitrogen stream.

9. The heat exchange surface of claim 7, wherein said inner diameter of the heat exchange tube is less than or equal to 1.0 inches.

10. The heat exchange surface of claim 1, wherein the surface is integrated with a distillation column of the air separation unit.

11. The heat exchange surface of claim 1, wherein said heat exchange surface is disposed within a main condenser of the air separation unit.

12. The heat exchange surface of claim 1, wherein said heat exchange surface is an inner surface of a heat exchange tube in a shell and tube heat exchanger of the air separation unit.

13. The heat exchange surface of claim 1, wherein said heat exchange surface is an outer surface of a heat exchange tube in a shell and tube heat exchanger of the air separation unit.

14. A shell and tube heat exchanger for use in an air separation unit, comprising:
 a shell;
 a plurality of heat exchange tubes disposed and retained within the shell, each heat exchange tube having a boiling surface and a heat input surface, the shell and tube heat exchanger configured to allow a one fluid to flow through the heat exchange tubes and another fluid to flow within the shell and outside the heat exchange tubes; and
 a porous coating applied to the boiling surface of each of the plurality of heat exchange tubes, the porous coating comprising aluminum, magnesium and tin metallic particles;
 wherein the aggregate amount of magnesium metallic particles and tin metallic particles is not greater than 15 wt % of the weight of the porous coating;
 wherein the aggregate amount of metallic particles that are aluminum or aluminum alloys is greater than 78 wt %;
 wherein the porous coating has an average particle size diameter ranging from about 35 μm to about 55 μm;
 wherein the porous coating has a thickness ranging from about 300 μm to about 400 μm;
 wherein the porous coating has a median pore diameter ranging from about 7 μm to about 12 μm; and
 wherein the porous coating has an overall porosity ranging from about 40% to about 60% based on the overall volume of the porous coating.

15. The shell and tube heat exchanger of claim 14, wherein the porous coating optionally includes metallic particles of copper, iron, or silicon, and wherein the aggregate amount of metallic particles that are copper, iron or silicon is less than 7 wt %.

16. The shell and tube heat exchanger of claim 14, wherein the magnesium metallic particles range from about 0.1 wt % to about 10 wt % of the porous coating, and the tin metallic particles range from about 0.1 wt % to about 5 wt % of the porous coating.

17. The shell and tube heat exchanger of claim 14, wherein the shell and tube heat exchanger is a main condenser of the air separation unit.

18. The shell and tube heat exchanger of claim 14 wherein the boiling surface is configured to boil oxygen.

19. The shell and tube heat exchanger of claim 14 wherein the heat input surface is configured to transfer heat from a nitrogen stream.

20. The shell and tube heat exchanger of claim 14, wherein the boiling surface is an inner surface of each of the plurality of the heat exchanger tubes and the heat input surface is an outer surface of each of the plurality heat exchange tubes.

* * * * *